(12) United States Patent
Takahara et al.

(10) Patent No.: US 8,005,646 B2
(45) Date of Patent: Aug. 23, 2011

(54) PLANT ALARM APPARATUS AND PLANT ALARM METHOD

(75) Inventors: Kaoru Takahara, Tokyo (JP); Kenji Kuroumaru, Tokyo (JP); Keiko Ootani, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 151 days.

(21) Appl. No.: 12/208,742

(22) Filed: Sep. 11, 2008

(65) Prior Publication Data

US 2009/0076634 A1    Mar. 19, 2009

(30) Foreign Application Priority Data

Sep. 19, 2007   (JP) ................................ 2007-241823

(51) Int. Cl.
*G06F 19/00*   (2006.01)
(52) U.S. Cl. ....................................................... 702/185
(58) Field of Classification Search .................. 702/117, 702/118, 182–185, 188
See application file for complete search history.

(56) References Cited

U.S. PATENT DOCUMENTS

| | | | | |
|---|---|---|---|---|
| 5,852,793 A | * | 12/1998 | Board et al. .................. | 702/56 |
| 2008/0255681 A1 | * | 10/2008 | Scott et al. .................. | 700/12 |
| 2009/0065578 A1 | * | 3/2009 | Peterson et al. ............. | 235/382 |

FOREIGN PATENT DOCUMENTS

| | | |
|---|---|---|
| CN | 1502035 A | 6/2004 |
| JP | 02-021307 | 1/1990 |
| JP | 08-202443 | 8/1996 |
| JP | 2772179 | 4/1998 |
| JP | 2003-280707 | 10/2003 |
| WO | WO 02/066933 | 8/2002 |

OTHER PUBLICATIONS

Office Action mailed Feb. 8, 2011, in corresponding Japanese Application Publication No. JP 2007-241823, filed Mar. 10, 2006.

* cited by examiner

*Primary Examiner* — Edward Raymond
(74) *Attorney, Agent, or Firm* — Oblon, Spivak, McClelland, Maier & Neustadt, L.L.P.

(57) ABSTRACT

A plant alarm apparatus has: plant data input means for periodically taking in plant data; a latest plant data value table for temporarily storing latest values of the plant data; plant data recording means for taking out the latest values of the data of the latest plant data value table and storing them in a plant history data table; alarm-triggering value alteration means for updating the points for detecting plant abnormality in an alarm-triggering value registration table in response to a request by an operator; alarm-triggering condition editing means for registering alarm-triggering conditions of points showing a foretoken of abnormality; deviation-from-limit-value determining means for reading the stored values of the alarm-triggering value registration table and the alarm-triggering condition table and comparing the limit values of the points for detecting abnormality; and alarm notification output means for outputting the outcome of the comparison.

7 Claims, 14 Drawing Sheets

| TIME | POINT A | POINT B | POINT C | POINT D | POINT E | ... |
|---|---|---|---|---|---|---|
| 06/01/02 00:01 | 100.0 | 1.92 | 25.3 | 9.05 | 234.1 | ... |

| TIME | POINT A | POINT B | POINT C | POINT D | POINT E | ... |
|---|---|---|---|---|---|---|
| 06/01/01 01:00 | 103.2 | 1.92 | 25.3 | 9.05 | 234.1 | ... |
| 06/01/01 01:01 | 102.1 | 1.91 | 25.3 | 9.54 | 235.2 | ... |
| 06/01/01 01:02 | 110.2 | 1.98 | 25.2 | 9.53 | 236.7 | ... |
| 06/01/01 01:03 | 101.7 | 1.97 | 25.2 | 9.52 | 240.9 | ... |
| 06/01/01 01:03 | 100.4 | 1.88 | 25.2 | 9.03 | 233.3 | ... |
| 06/01/01 01:03 | 99.7 | 1.87 | 25.1 | 0.21 | 321.2 | ... |
| : | : | : | : | : | : | |

| WATCH POINTS | LOWER LIMIT | UPPER LIMIT |
|---|---|---|
| POINT A | 100 | 0 |
| POINT D | – | 25 |
| : | : | : |
| (SPARE) | (SPARE) | (SPARE) |

| WATCH POINTS | CONDITION | NOTIFIED CONTENT |
|---|---|---|
| POINT A | POINT Y > 100 | 10 MINUTES BEFORE |
| (SPARE) | (SPARE) | (SPARE) |
| : | : | : |
| m | | |

| WATCH POINTS | CONDITION 1 | | CONDITION 2 | | CONDITION 3 | | NOTIFIED CONTENT |
|---|---|---|---|---|---|---|---|
| POINT A | POINT Z > 100 | — | (SPARE) | — | — | — | 10 MINUTES BEFORE |
| POINT D | POINT W > 50 | AND | POINT Z > 25 | — | | — | 15 MINUTES BEFORE |
| (SPARE) | (SPARE) | — | (SPARE) | — | — | — | (SPARE) |
| ⋮ | ⋮ | ⋮ | ⋮ | ⋮ | ⋮ | ⋮ | ⋮ |
| m | (SPARE) | — | (SPARE) | — | — | — | (SPARE) |

| OCTOBER 3, 2005 | La |
| JANUARY 3, 2006 | La |
| FEBRUARY 16, 2006 | LIMIT IS CHANGED FROM La TO Lb |
| MARCH 10, 2006 | Lb |

PLANT ALARM APPARATUS AND PLANT ALARM METHOD

CROSS REFERENCE TO RELATED APPLICATION

This application is based upon and claims the benefits of priority from the prior Japanese Patent Applications No. 2007-241823, filed in the Japanese Patent Office on Sep. 19, 2007, the entire content of which is incorporated herein by reference.

BACKGROUND OF THE INVENTION

The present invention relates to an apparatus and a method for detecting a foretoken of abnormality in a plant such as a power plant and issuing an alarm in good time.

A point value (sensor reading) is defined in advance for close surveillance in conventional power plants in order to detect any abnormality in the plant. Then, the latest plant data is compared with the upper and lower limit values defined for the point value and the plant is determined to be in an abnormal condition when the data is out of the limit values (refer to Japanese Patent Publication No. 2,772,179, the entire contend of which is incorporated herein by reference).

With the above-described technique, time is required for plant operators to cope with the situation where the plant is currently being operated and if an abnormal condition of the plant is detected by referring to the point value for close surveillance. In other words, abundant knowledge and experiences of skilled power plant operators are required to define optimum upper and lower limit values. Then, the plant may need to be repeatedly subjected to test runs and the upper and lower limit values may have to be altered for a number of times at the cost of time and labor on the part of such skilled power plant operators.

SUMMARY OF THE INVENTION

In view of the above-described circumstances, it is therefore an object of the present invention to provide an apparatus and a method for detecting a foretoken of abnormality in a plant such as a power plant and notifying the operator in charge of the foretoken.

According to an aspect of the present invention, there is provided a plant alarm apparatus comprising: plant data input means for periodically taking in plant data from each of sensors arranged in a plant; a latest plant data value table for temporarily storing latest values of the plant data taken in by the plant data input means; plant data recording means for taking out the latest values of the data of the latest plant data value table and storing them in a plant history data table as long term time series plant data; alarm-triggering value alteration means for updating the points for detecting any plant abnormality in an alarm-triggering value registration table in response to a request made by an operator; alarm-triggering condition editing means for registering alarm-triggering conditions of at least one point showing a foretoken of abnormality in an alarm-triggering condition table when the plant falls into an abnormal condition; deviation-from-limit-value determining means for reading the stored values of the alarm-triggering value registration table and the alarm-triggering condition table and comparing the limit values of the at least one point for detecting any abnormality of the plant and the alarm-triggering conditions with the latest plant data value; and alarm notification output means for outputting the outcome of the comparison to a display apparatus when the comparison by the deviation from limit vale determining means shows a deviation from a predetermined range.

According to another aspect of the present invention, there is provided a plant alarm method comprising: a plant data input step of periodically taking in plant data from each of sensors arranged in a plant; a temporarily storing step of temporarily storing latest values of the plant data taken in the plant data input step in a latest plant data value table; a plant data recording step of taking out the latest values of the data of the latest plant data value table and storing them in a plant history data table as long term time series plant data; an alarm-triggering values alteration step of updating the points for detecting any plant abnormality in an alarm-triggering value registration table in response to a request made by an operator; an alarm-triggering conditions editing step of registering alarm-triggering conditions of at least one point showing a foretoken of abnormality in an alarm-triggering condition table when the plant falls into an abnormal condition; a deviation-from-limit-value determining step of reading the stored values of the alarm-triggering value registration table and the alarm-triggering condition table and comparing the limit values of at least one point for detecting any abnormality of the plant and the alarm-triggering conditions with the latest plant data value; and an alarm notification output step of outputting outcome of the comparison to a display apparatus when the comparison by the deviation from limit vale determining step shows a deviation from a predetermined range.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Now, preferred embodiments of the plant alarm apparatus according to the present invention will be described in greater detail by referring to the accompanying drawings. Throughout the drawings, the same or similar parts are denoted by the same reference symbols and will not be described repeatedly.

First Embodiment

Figure 1:
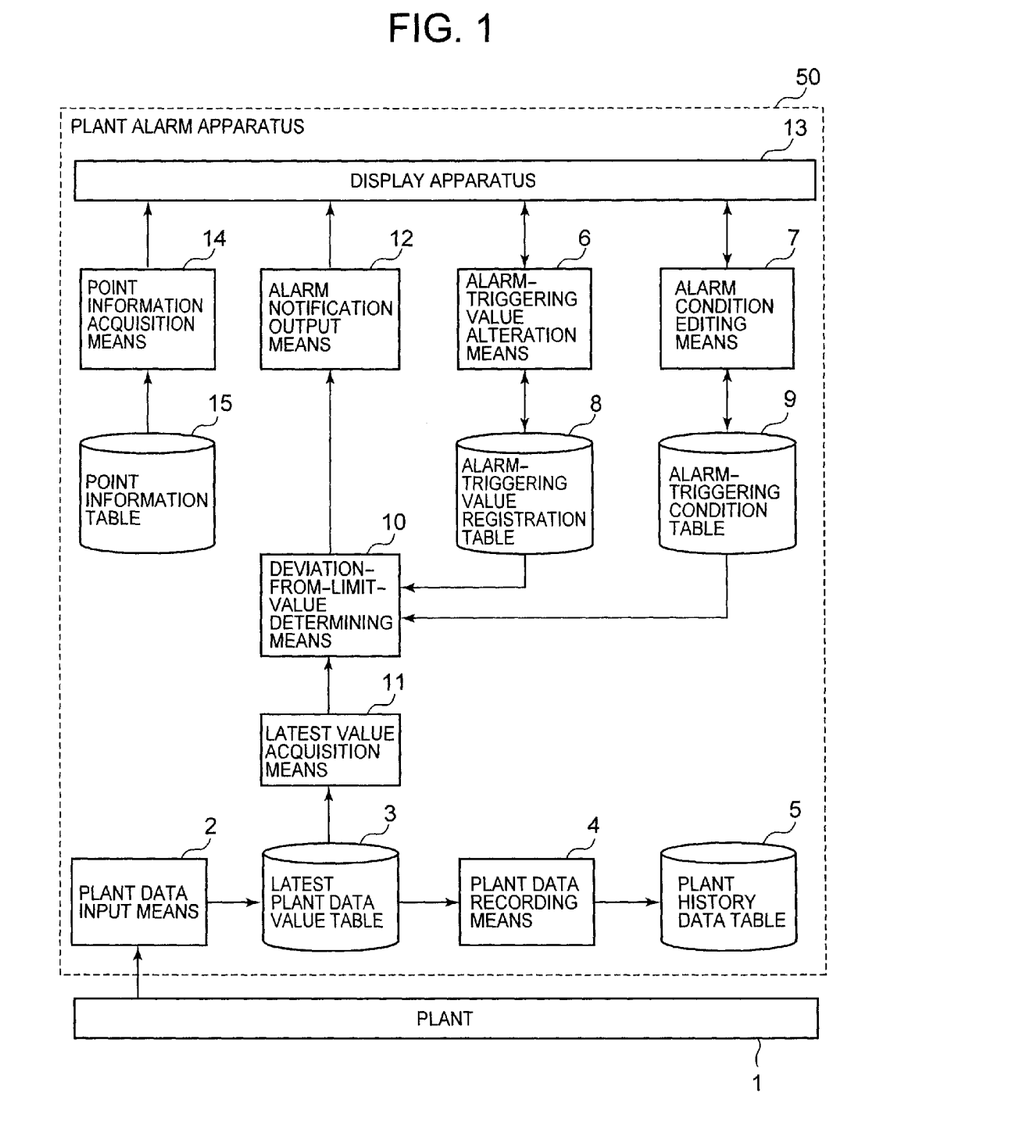
FIG. 1 is a schematic block diagram of a first embodiment of plant alarm apparatus according to the present invention.
Figure 9:
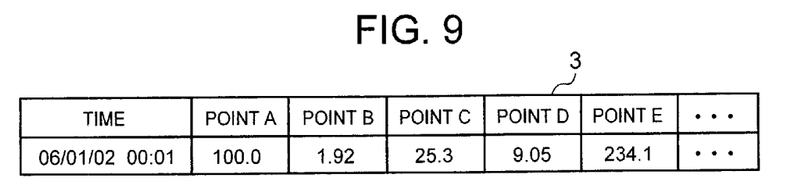
FIG. 9 is an exemplary latest plant data value table that can be used for the first embodiment of plant alarm apparatus of the present invention.
Figure 10:
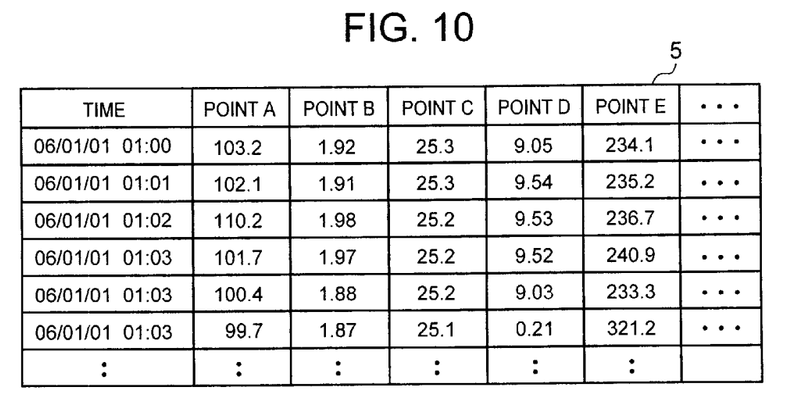
FIG. 10 is an exemplary plant history data table that can be used for the first embodiment of plant alarm apparatus of the present invention.
Figure 11:
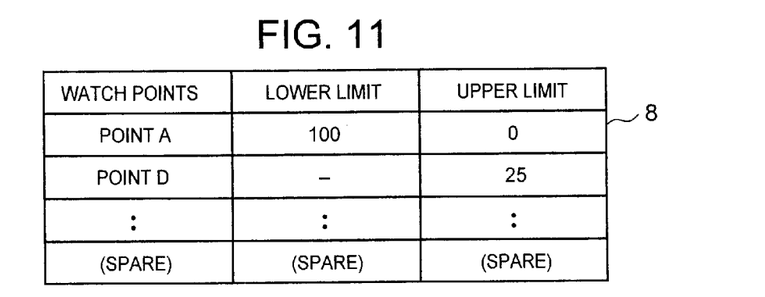
FIG. 11 is an exemplary defined alarm-triggering value registration table that can be used for the first embodiment of plant alarm apparatus of the present invention.
Figure 12:
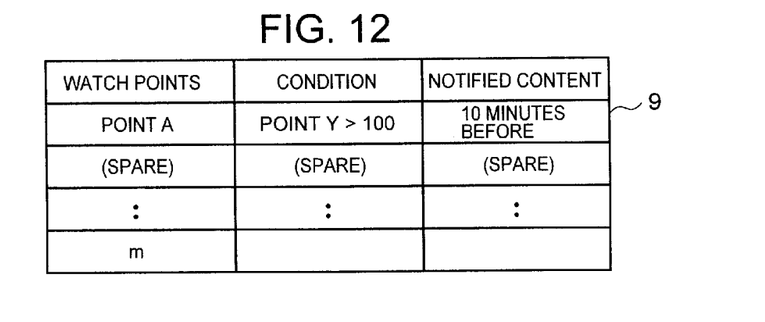
FIG. 12 is an exemplary alarm-triggering condition table that can be used for the first embodiment of plant alarm apparatus of the present invention.
Figure 13:
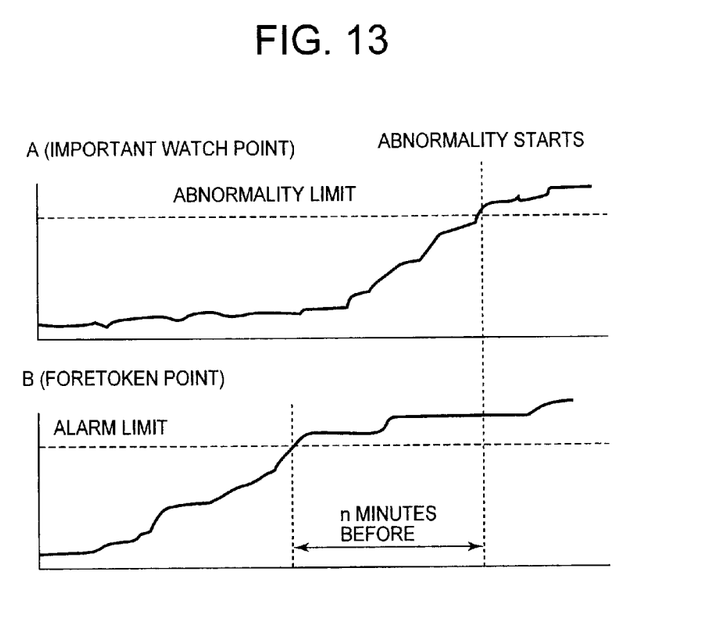
FIG. 13 is a graph showing an exemplary relationship between an important watch point and a foretoken point that can be used for the first embodiment of plant alarm apparatus of the present invention.

Firstly, the first embodiment will be described by referring to FIGS. 1 and 9 through 13. FIG. 1 is a schematic block diagram of the first embodiment of plant alarm apparatus according to the present invention. FIG. 9 is an exemplary latest plant data value table that can be used for the first embodiment of plant alarm apparatus. FIG. 10 is an exemplary plant history data table. FIG. 11 is an exemplary defined alarm-triggering value registration table. FIG. 12 is an exemplary alarm-triggering condition table. FIG. 13 is a graph showing an exemplary relationship between an important watch point and a foretoken point.

A plant alarm apparatus 50 periodically takes in plant data from the various sensors arranged in a plant 1 and displays useful information to the operator in charge of the plant according to the data. The plant alarm apparatus 50 has a plant data input means 2, which actually periodically takes in plant data from the various sensors arranged in the plant 1.

The instantaneous values that are taken in are written into a latest plant data value table 3 along with clock time information. The instantaneous values of plant data observed at various watch points at the clock time are recorded in the latest plant data value table 3 as shown in FIG. 9. The contents of the latest plant data value table 3 are written into a plant history data table 5 for storing plant data in time series for a long time by a plant data recording means 4. The plant data values observed at various watch points at a series of different clock times are recorded in the plant history data table 5 as typically shown in FIG. 10.

The contents stored in the latest plant data value table 3 are periodically read by a latest value acquisition means 11.

A display apparatus 13 includes a display unit as well as interactive input units such as a mouse and a keyboard (not shown). The operator can specify one or more than one important points for monitoring a plant abnormality by way of the display apparatus 13 and register alarm-triggering values in an alarm-triggering value registration table 8 for those points by an alarm-triggering value alteration means 6. In the alarm-triggering value registration table 8, an upper limit value and a lower limit value are typically defined for each watch point as shown in FIG. 11.

An alarm condition editing means 7 registers alarm points that provide foretokens for the important points for monitoring a plant abnormality by way of the display apparatus 13 in an alarm-triggering condition table 9. For example, the alarm-triggering conditions of each watch point and the specification of the alarm (notification) are defined in the alarm-triggering condition table 9 as shown in FIG. 12.

The operator can extract one or more than one watch points for detecting a plant abnormality and one or more than one alarm points that provide foretokens by a point information acquisition means 14 from a point information table 15 by way of the display apparatus 13.

A deviation-from-limit-value determining means 10 periodically reads the contents of the latest plant data value table 3, those of the alarm-triggering value registration table 8 and those of the alarm-triggering condition table 9 and compares the latest value with the limit values and the alarm-triggering conditions of each watch point for detecting a plant abnormality to see if the latest value is within the limit values or not in order to detect any plant abnormality. If the latest value goes out of the limit values or the alarm-triggering conditions of the point, the deviation-from-limit-value determining means 10 displays the deviation from the limit values or the alarm-triggering conditions on the display apparatus 13 by way of an alarm notification output means 12 to notify the operator of the deviation. Thus, the operator can be notified of a prediction that a plant abnormality that may take place after a predetermined time period.

With this embodiment, a preliminary alarm can be issued in advance before a true alarm is issued from an important watch point by defining the conditions to be met at each related foretoken point as alarm conditions as shown in FIG. 13. Then, the damage due to an abnormality of the plant 1 can be minimized. As a preliminary alarm is issued, issuance of a true alarm at an important watch point can be avoided so that occurrence of a plant abnormality can be prevented from taking place.

Second Embodiment

Figure 2:
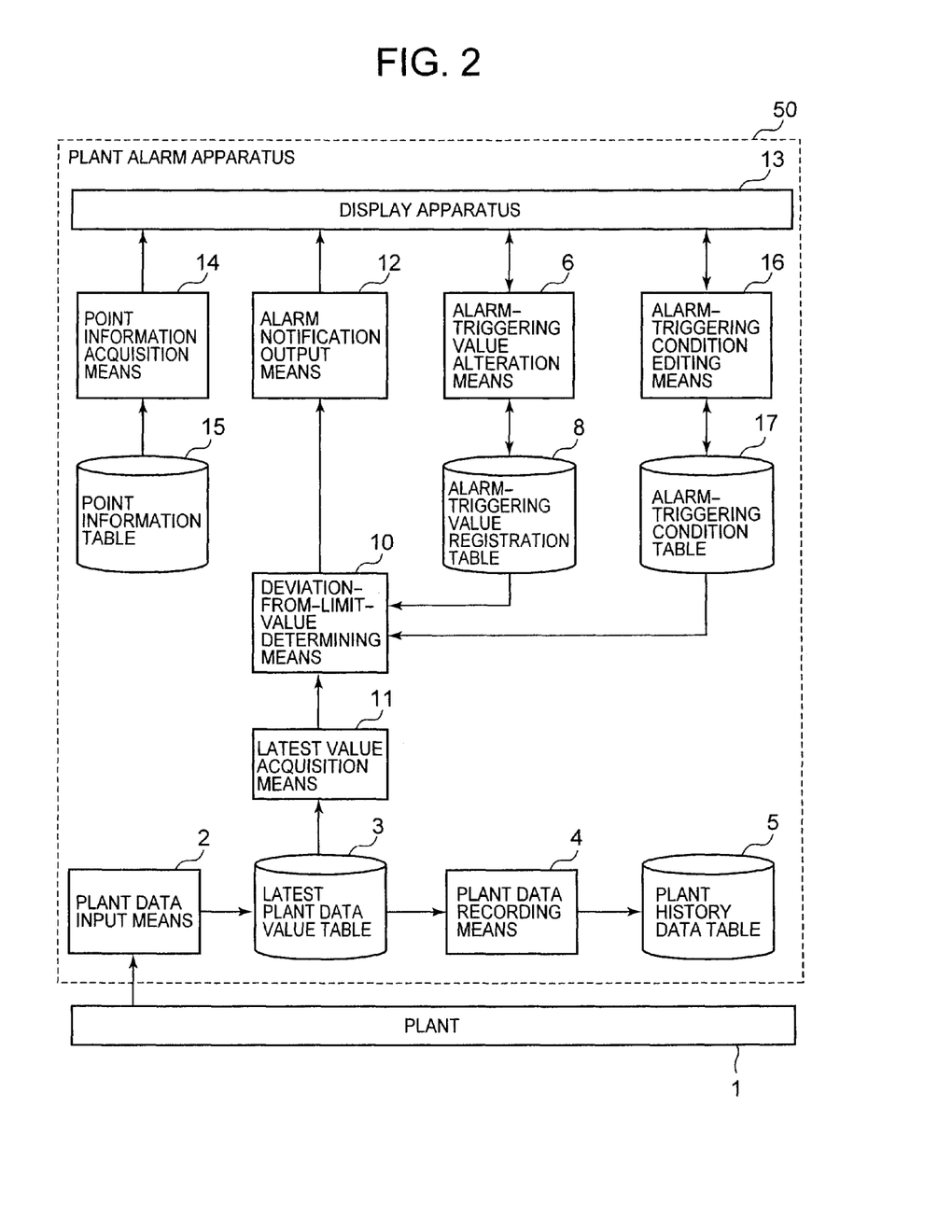
FIG. 2 is a schematic block diagram of a second embodiment of plant alarm apparatus according to the present invention.
Figure 14:
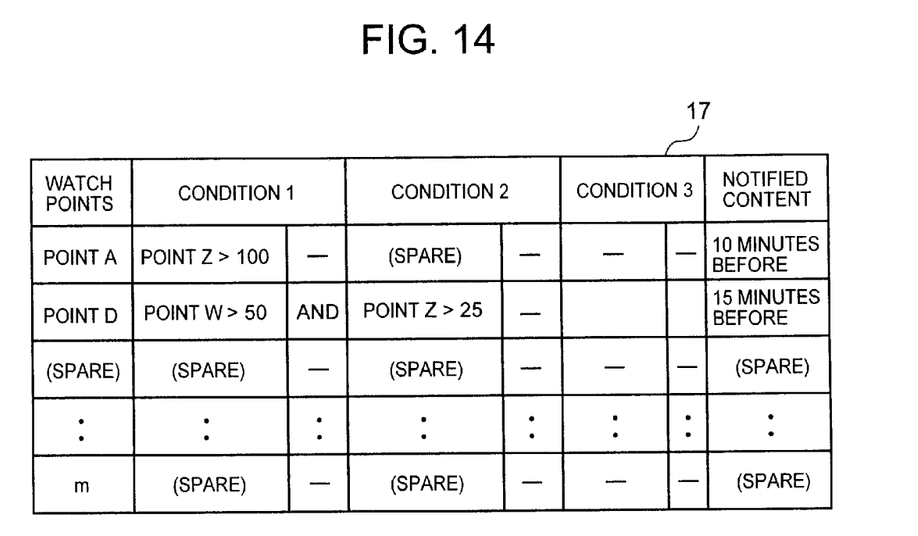
FIG. 14 is an exemplary alarm-triggering condition table that can be used for the second embodiment of plant alarm apparatus of the present invention.
Figure 15:
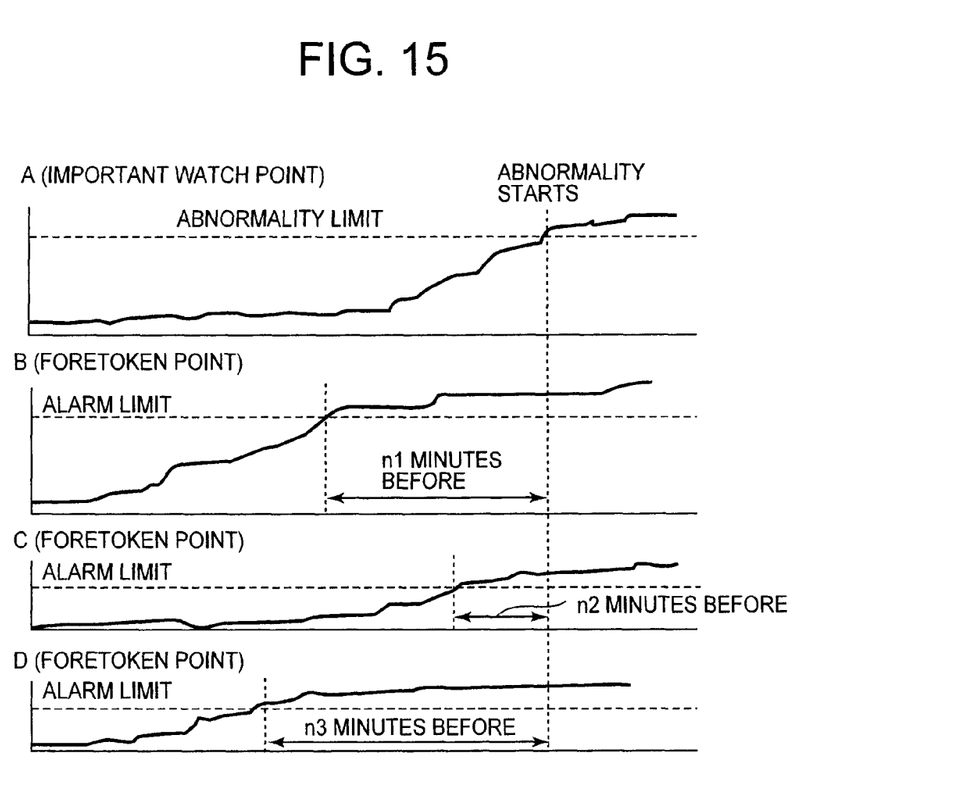
FIG. 15 is a graph showing an exemplary relationship between an important watch point and a plurality of foretoken points that can be used for the second embodiment of plant alarm apparatus of the present invention.

Now, the second embodiment of the present invention will be described below by referring to FIGS. 2, 14 and 15. FIG. 2 is a schematic block diagram of the second embodiment of plant alarm apparatus. FIG. 14 is an exemplary alarm-triggering condition table that can be used for the second embodiment. FIG. 15 is a graph showing an exemplary relationship between an important watch point and a plurality of foretoken points.

As shown in FIG. 2, the plant alarm apparatus 50 of this embodiment is characterized by having a plurality of alarm-triggering condition editing means 16 for registering a plurality of points for alarm-triggering conditions by means of logical operators and a plurality of alarm-triggering condition table 17 where a plurality of points are registered for alarm-triggering conditions if compared with the first embodiment. As shown in FIG. 14, the plurality of alarm-triggering condition table 17 typically defines alarm-triggering conditions of points that provide foretokens for watch points for detecting any plant abnormality by recombining a plurality of points by means of logical operators such as AND and OR. The plurality of alarm-triggering condition table 17 is registered by the plurality of alarm-triggering condition editing means 16.

With this embodiment, a plurality of alarm points that provide foretokens can be incorporated for conditions. Thus, the cause of any issued alarm can be easily pinpointed.

Third Embodiment

Figure 3:
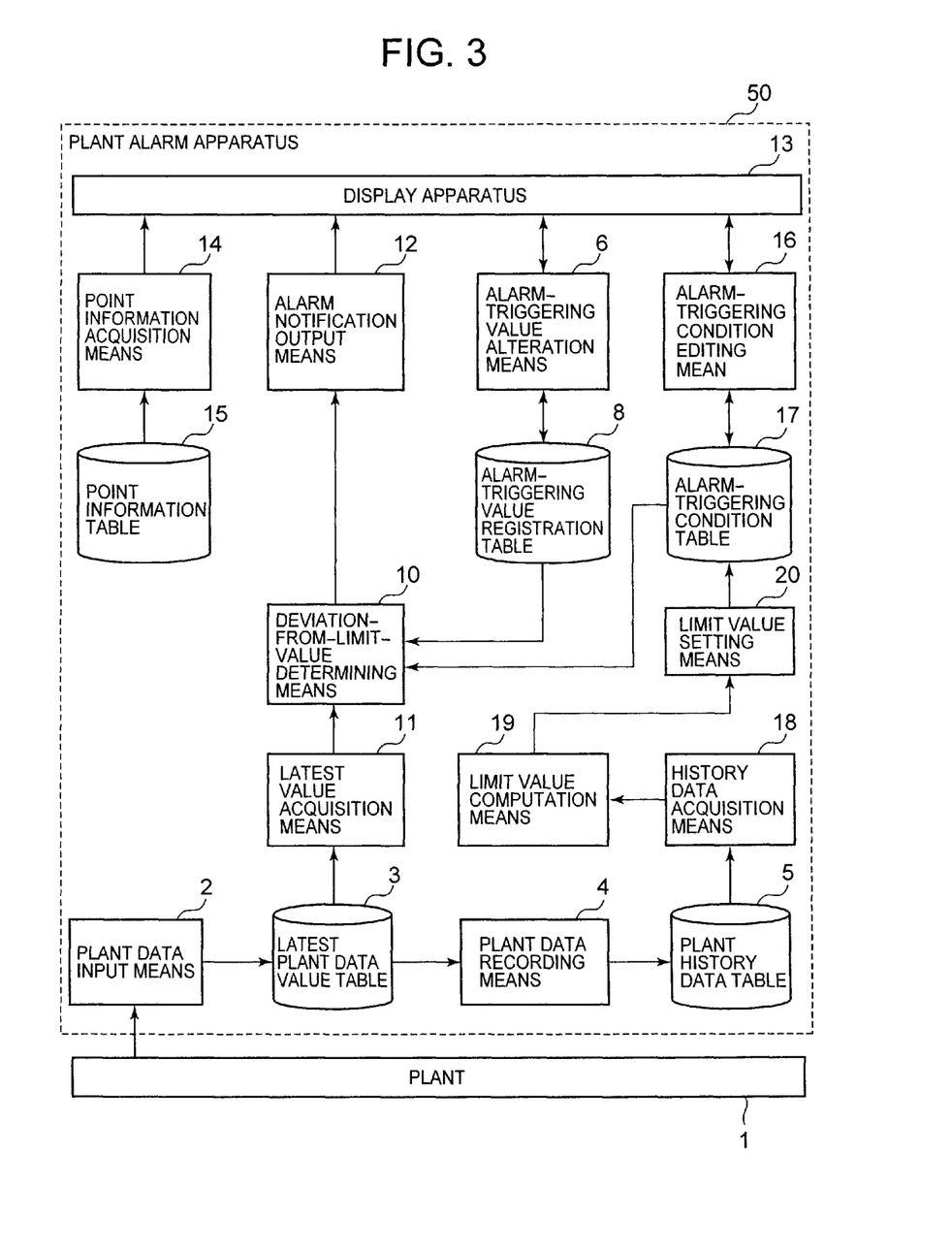
FIG. 3 is a schematic block diagram of a third embodiment of plant alarm apparatus according to the present invention.
Figure 16:
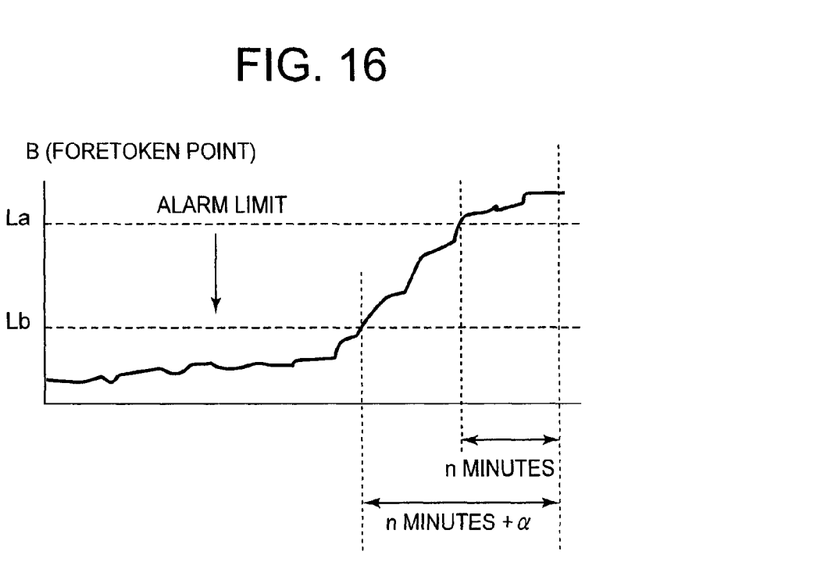
FIG. 16 is an exemplary alarm-triggering condition table that can be used for the third embodiment of plant alarm apparatus of the present invention.

Now, the third embodiment of the present invention will be described below by referring to FIGS. 3 and 16. FIG. 3 is a schematic block diagram of the third embodiment of plant alarm apparatus according to the present invention. FIG. 16 is an exemplary alarm-triggering condition table that can be used for the third embodiment.

As shown in FIG. 3, the third embodiment is characterized by having a history data acquisition means 18 for going back by a necessary time period from the time when a deviation from a limit value took place in the past, a limit value computation means 19 for acquiring limit values according to the acquired history data and a limit value setting means 20 for setting the acquired limit values if compared with the above-described second embodiment.

Thus, when registering limit values for defining an issuance of alarm prediction clock time to be included in the alarm-triggering conditions of the foretoken point that provides a foretoken for the watch point for detecting a plant abnormality with this embodiment, a necessary time period is traced back by the history data acquisition means 18 from the time when a deviation from a limit value took place in the past on the plant history data table 5 and limit values are set in the plurality of alarm-triggering condition table 17 (FIG. 14) from the limit value computation means 19 for acquiring limit values by way of the limit value setting means 20.

With this arrangement, an alarm is issued early when a limit value at point B that provides a foretoken is altered from La to Lb as shown in FIG. 16. Then, the operator is notified earlier. Since the time of notification of the alarm at the alarm point that provides a foretoken comes earlier, the time for checking the plant conditions in advance is extended so that the influence of an accident can be minimized.

Fourth Embodiment

Figure 4:
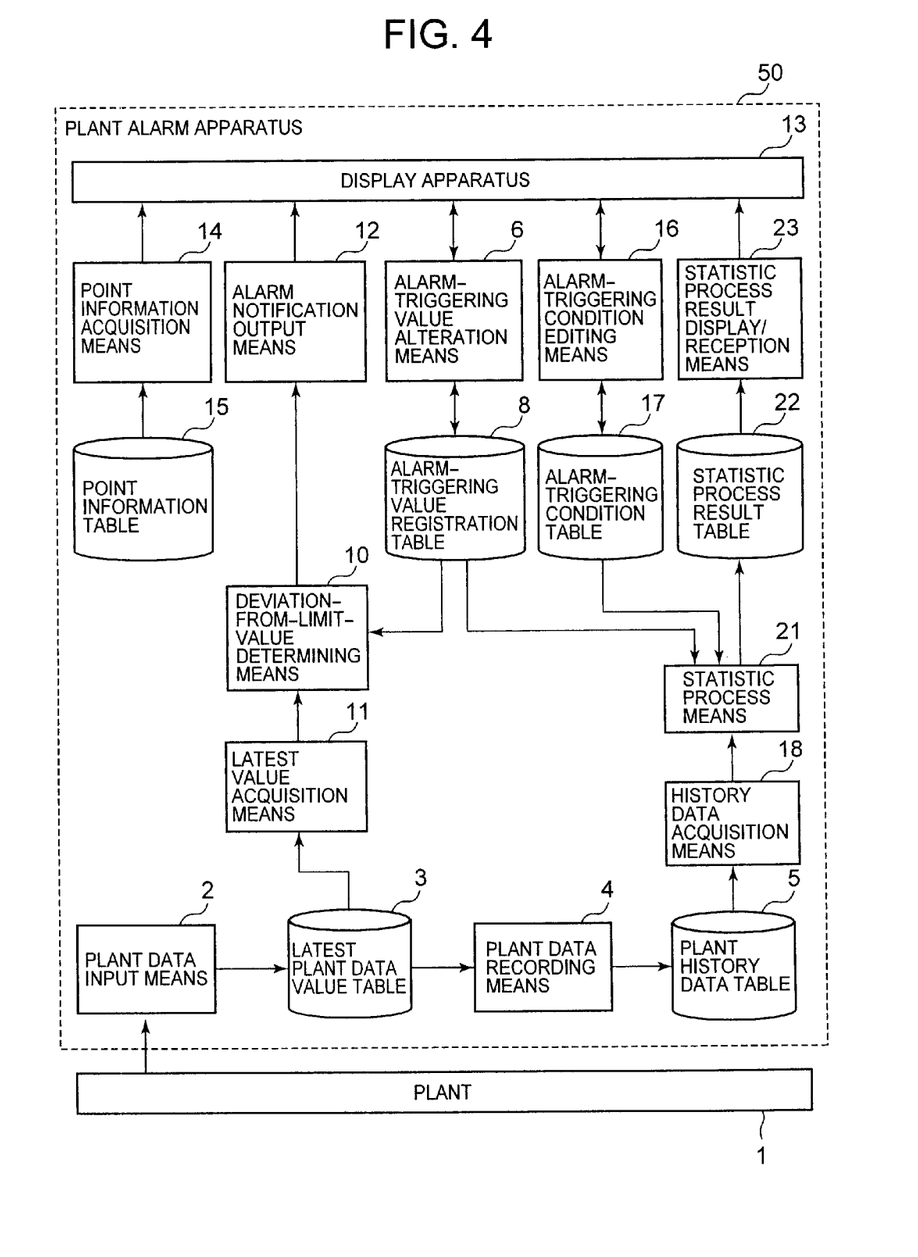
FIG. 4 is a schematic block diagram of a fourth embodiment of plant alarm apparatus according to the present invention.
Figure 17:
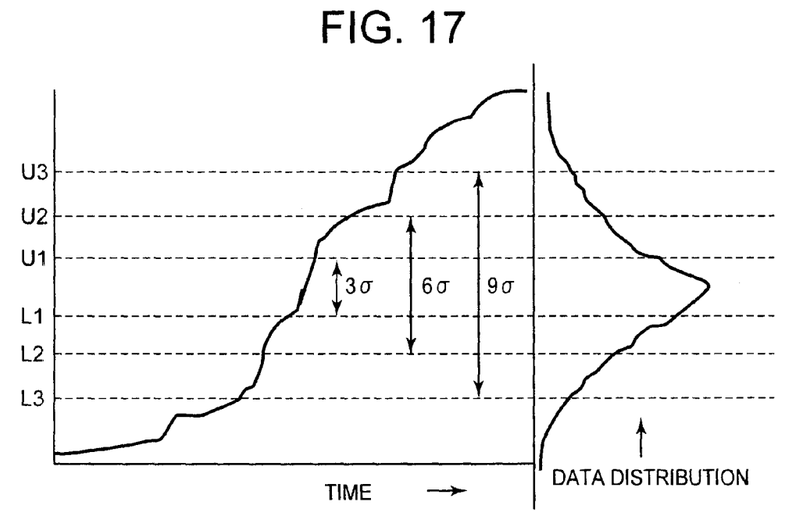
FIG. 17 is a graph showing the results of an exemplary statistic process that can be used for the fourth embodiment of plant alarm apparatus of the present invention.

Now, the fourth embodiment of the present invention will be described below by referring to FIGS. 4 and 17. FIG. 4 is a schematic block diagram of the fourth embodiment of plant alarm apparatus. FIG. 17 a graph showing the results of an exemplary statistic process that can be used for the fourth embodiment of plant alarm apparatus.

As shown in FIG. 4, the fourth embodiment is characterized by having a history data acquisition means 18 for acquiring history data from a plant history data table 5, a statistic process means 21 for computationally determining limit values by way of data distribution densities and a statistic process result display/reception means 23 for receiving requests for computationally determining limit values, storing the results of statistic processes in a statistic process result table 22 and displaying a graph illustrating the results on a display apparatus 13, if compared with the first through third embodiments.

In this embodiment, the history data acquisition means 18 acquires history data from the plant history data table 5. Then the statistic process means 21 computationally determines the statistic upper and lower limit values of each watch point for detecting any plant abnormality. The upper and lower limit values are computationally determined by means of the data distribution density of each of the clusters produced by dividing data. The results of statistic processes are then stored in the statistic process result table 22. Requests for displaying the stored statistic process results and those for computationally determining limit values are received at the statistic process result display/reception means 23 and displayed on the display apparatus 13 in the form of a graph typically as shown in FIG. 17.

The limit values that are computationally determined by using history data of the plant are highly reliable. In other words, limit values can be computationally determined highly accurately. Dispersions from the data distribution density can be checked since the results are displayed in the form of a graph.

Fifth Embodiment

Figure 5:
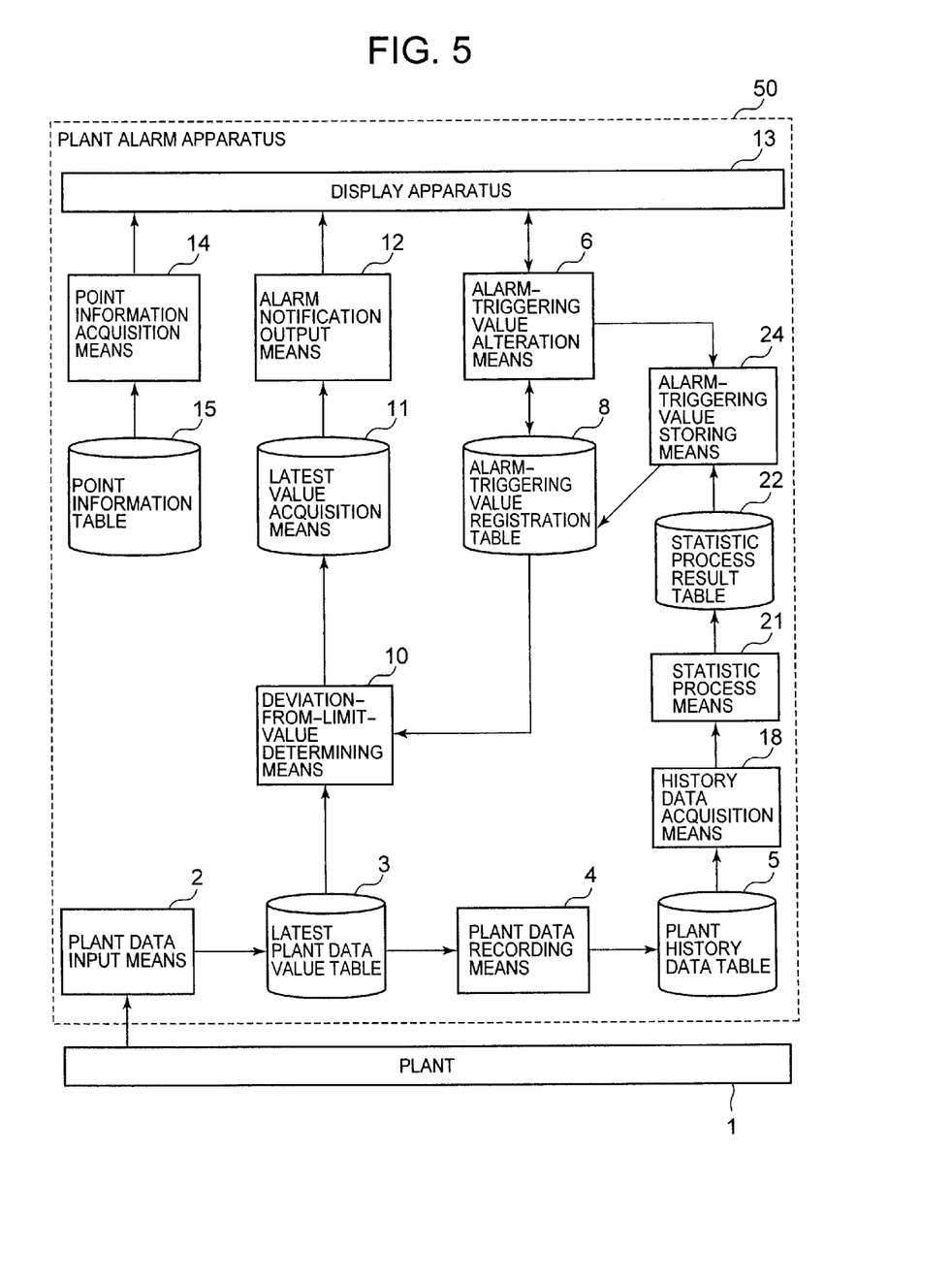
FIG. 5 is a schematic block diagram of a fifth embodiment of plant alarm apparatus according to the present invention.
Figure 18:
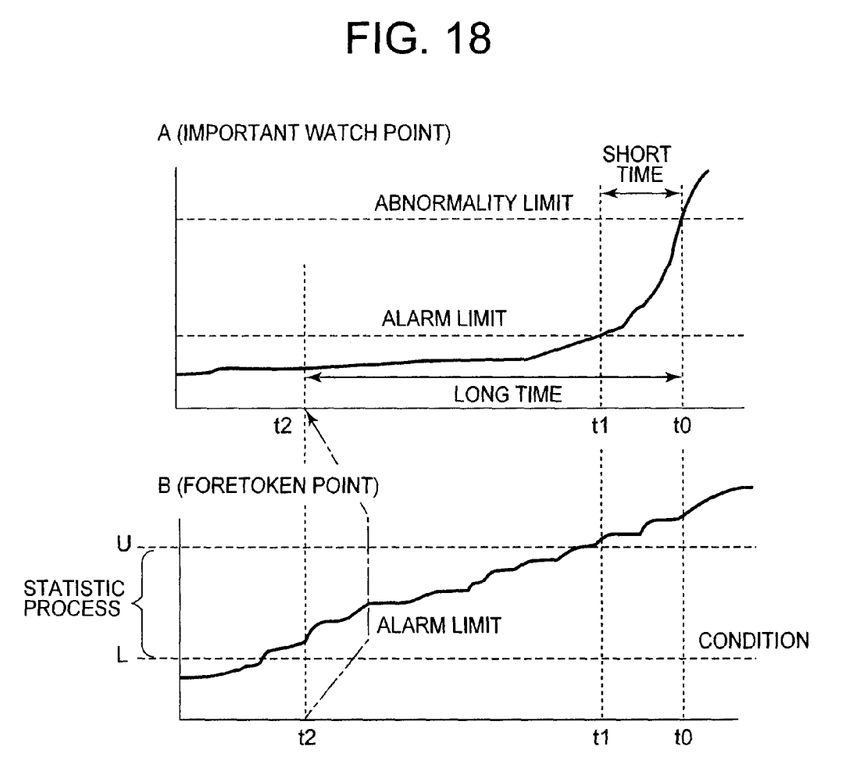
FIG. 18 is a graph showing an exemplary time from an alarm to occurrence of an abnormality that can be used for the fifth embodiment of plant alarm apparatus of the present invention.

Now, the fifth embodiment of the present invention will be described below by referring to FIGS. 5 and 18. FIG. 5 is a schematic block diagram of the fifth embodiment of plant alarm apparatus. FIG. 18 is a graph showing an exemplary relationship between an important watch point and a foretoken point that can be used for the fifth embodiment of plant alarm apparatus.

As shown in FIG. 5, the fifth embodiment is characterized by having an alarm-triggering value storing means 24 if compared with the fourth embodiment. The alarm-triggering value storing means 24 prepares a graph from the history data obtained by extracting the plant data of a specified point in a specified time period and a statistic process result table 22 and alters the alarm-triggering value registration table 8.

This embodiment extracts the past data of watch points for detecting any abnormality and foretoken points for executing statistic processes by way of the history data acquisition means 18 and displays them on a display apparatus 13 in the form of a time series graph as shown in FIG. 18. At this time, it acquires the defined alarm values at the points by way of the alarm-triggering value storing means 24 and displays the defined alarm values and their linear expressions on the graph. It also displays the abnormality occurrence clock times it acquires from the alarm data. It computationally determines the standard deviation of each of the foretoken points by way of the statistic process means 21 and defines alarm-triggering limit values of the points as multiples of the standard deviations, comparing them with the abnormality occurrence clock times.

As described above, a long time can be provided from an alarm to occurrence of an abnormality by setting a point where a long time passes from a large value change until an abnormality takes place for a foretoken point. Then, as a result, the operator can take time for taking a countermeasure before an abnormality takes place.

Sixth Embodiment

Figure 6:
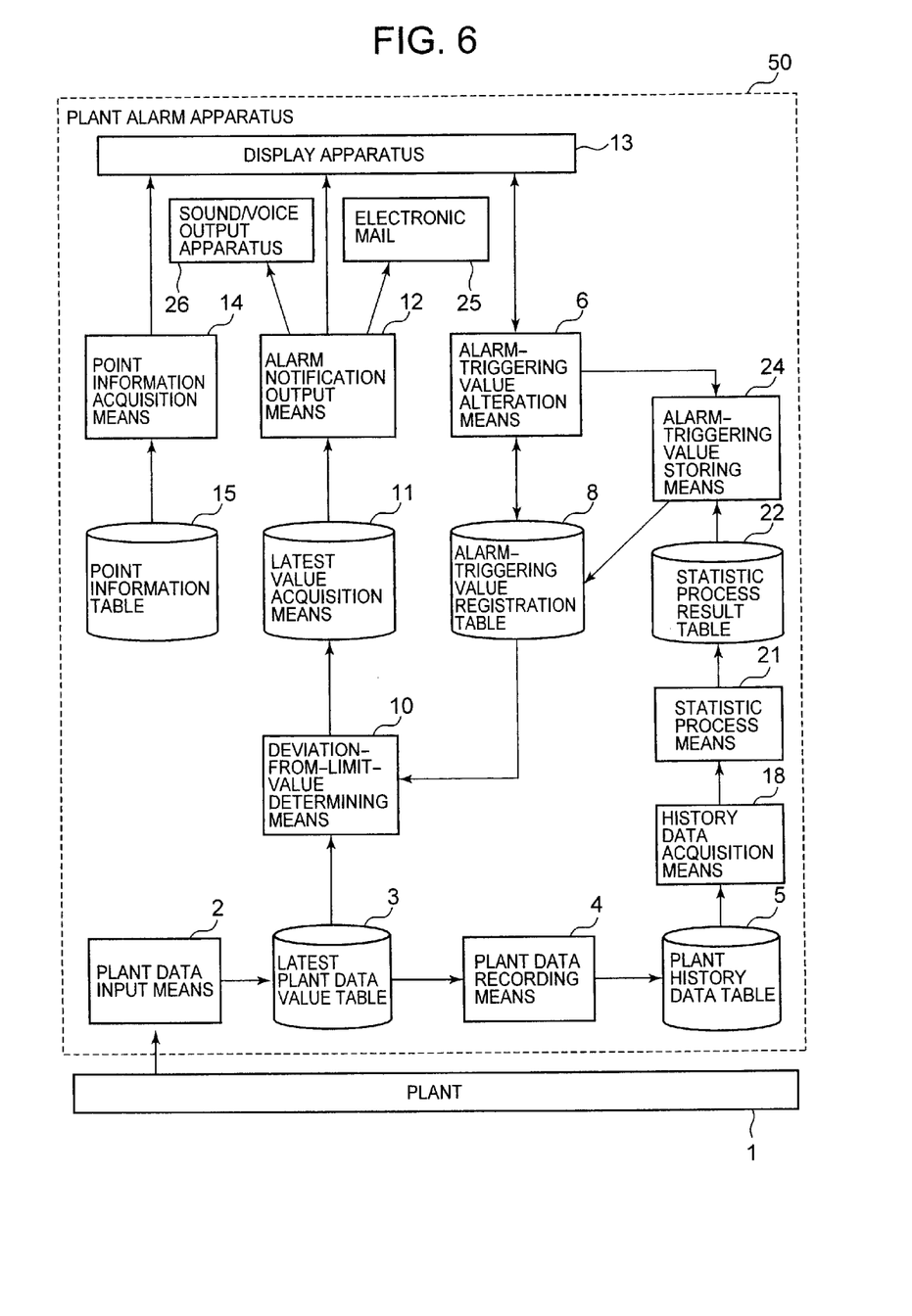
FIG. 6 is a schematic block diagram of a sixth embodiment of plant alarm apparatus according to the present invention.
Figure 19:
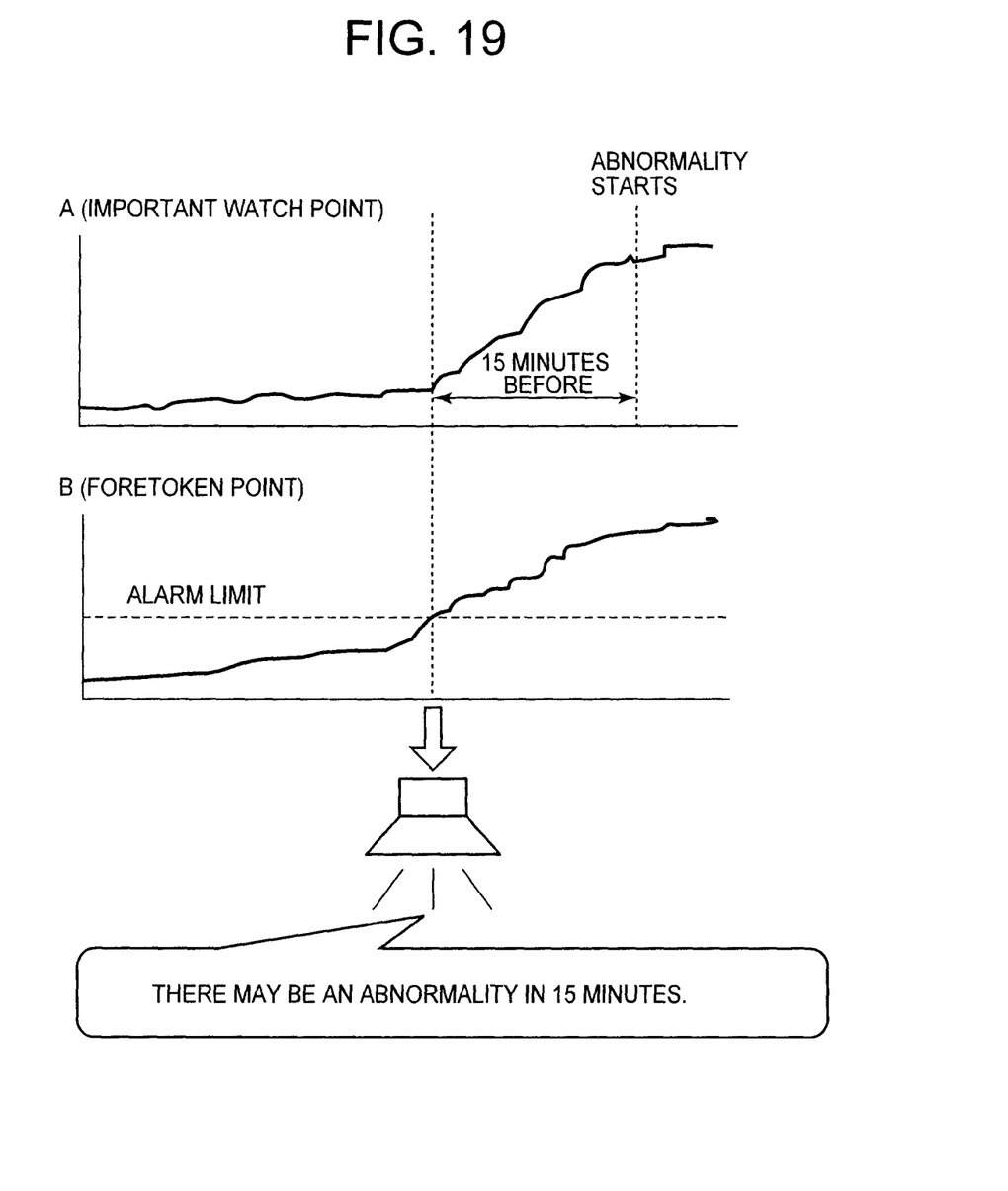
FIG. 19 is a schematic illustration of an exemplary announcement due to issuance of an alarm that can be used for the sixth embodiment of plant alarm apparatus of the present invention.

Now, the sixth embodiment of the present invention will be described below by referring to FIGS. 6 and 19. FIG. 6 is a schematic block diagram of the sixth embodiment of plant alarm apparatus. FIG. 19 is a schematic illustration of an exemplary announcement due to issuance of an alarm in the sixth embodiment.

As shown in FIG. 6, the sixth embodiment is characterized in that the output from the alarm notification output means 12 is sent to the display apparatus 13 for displaying the alarm on the display screen thereof and the alarm is notified by electronic mail 25 and also by sound from a sound/voice output apparatus 26 if compared with the fifth embodiment.

This embodiment acquires limit value information from the alarm-triggering value registration table 8 by way of the deviation-from-limit-value determining means 10. Then, the embodiment checks the latest plant data value table 3 for the points defined in the limit value information it acquired and determines if any of the latest plant data values goes out of the limit values or not. It does nothing when none of the data values goes out of the limit values but, when it finds out that one of the latest plant data values goes out of the limit values, it outputs alarm information to the selected one or ones of the display apparatus 13, the electronic mail 25 and the sound/voice output apparatus 26. The selected one or ones to be notified of are necessary one or ones, whichever appropriate, and may be all of the display apparatus 13, the electronic mail 25 and the sound/voice output apparatus 26. The selected one or ones are notified of the alarm information, which includes information on the point that shows a foretoken of abnormality and the expected time period before an abnormality takes place. Upon receiving the notification, the display apparatus 13 displays the alarm information on the display screen thereof, while the electronic mail 25 sends the alarm information to the specified addresses by electronic mail and the sound/voice output apparatus 26 announces the alarm information in voice (see FIG. 19).

As the foretoken points are automatically monitored by a computer in this way, the operator can notice the foretoken of abnormality if he or she is doing an operation other than a monitoring operation. Additionally, the foretoken of abnormality can be automatically notified to the manager or the like in addition to the operator by electronic mail. Then, as a result, the operator can take a counter measure before an abnormality takes place and the manager can issue an appropriate directive.

Seventh Embodiment

Figure 7:
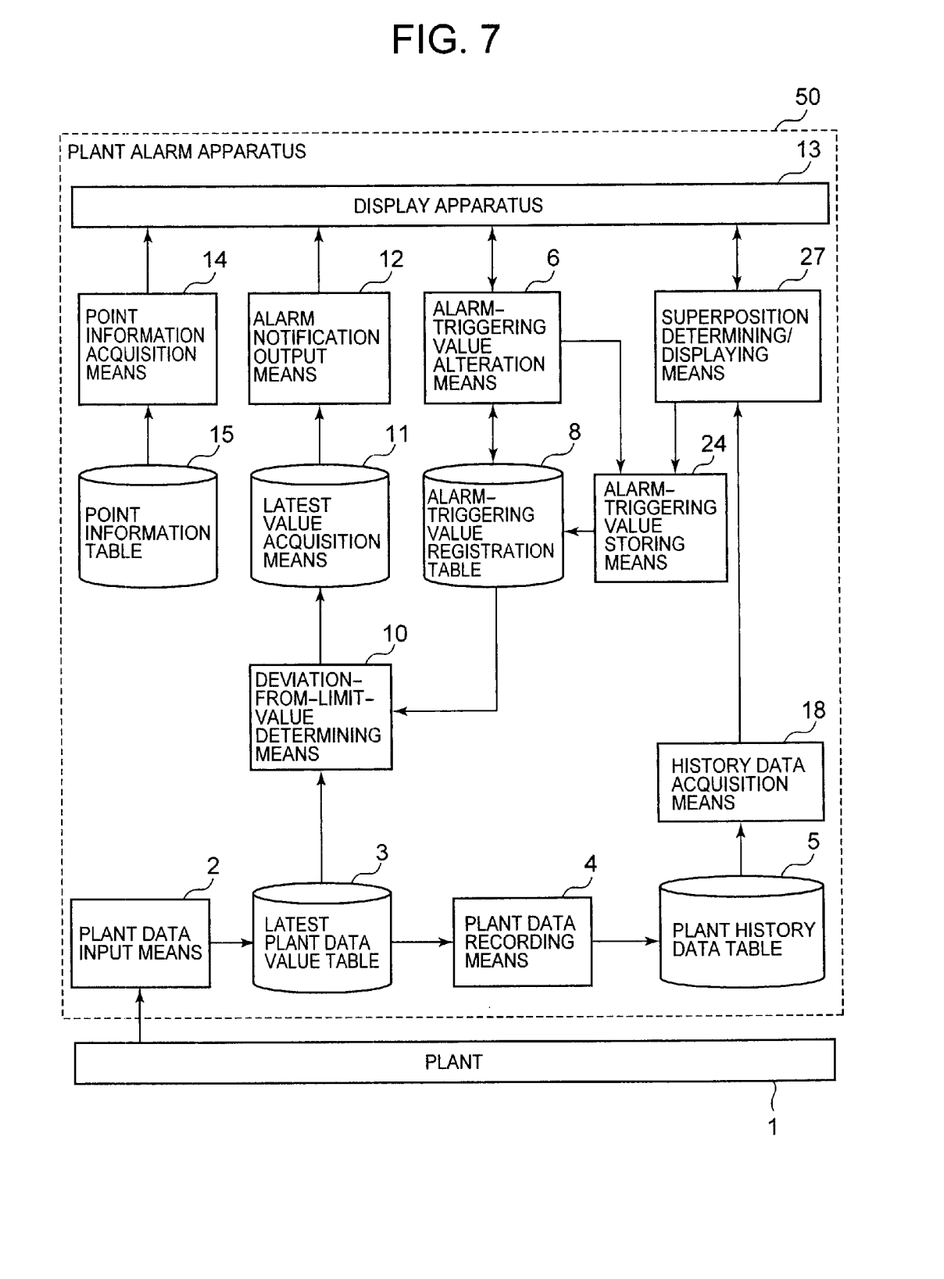
FIG. 7 is a schematic block diagram of a seventh embodiment of plant alarm apparatus according to the present invention.
Figure 20:
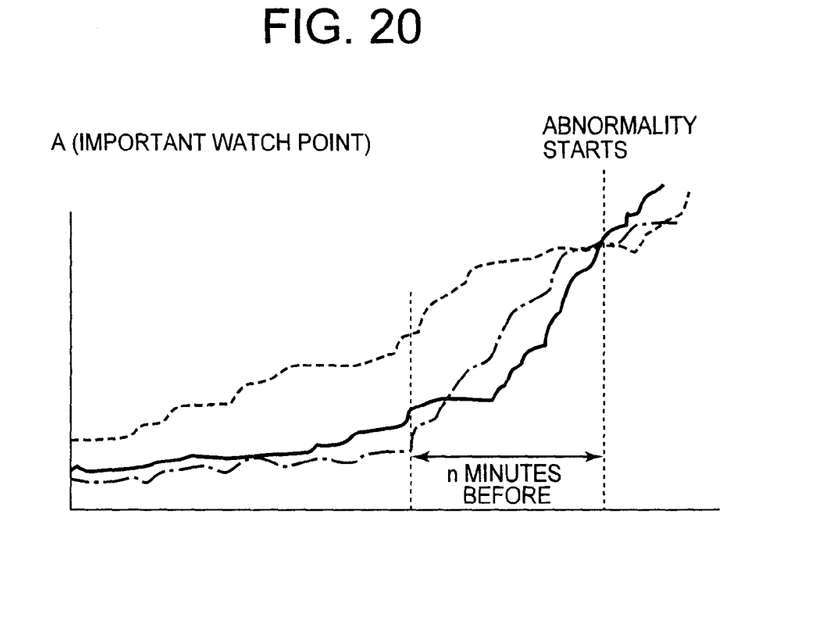
FIG. 20 is a graph showing an exemplary superposed display that can be used for the seventh embodiment of plant alarm apparatus of the present invention.

Now, the seventh embodiment of the present invention will be described below by referring to FIGS. 7 and 20. FIG. 7 is a schematic block diagram of the seventh embodiment of plant alarm apparatus. FIG. 20 is a graph showing an exemplary superposed display that can be used for the seventh embodiment.

As shown in FIG. 7, the seventh embodiment is characterized by having a superposition determining/displaying means 27 if compared with the fifth and sixth embodiments.

This embodiment displays a list of points on the display apparatus 13 by way of a point information acquisition means 14. Then, it specifies points for which alarm-triggering values are defined out of the displayed points and acquires past data of the specified points by way of the alarm-triggering value storing means 24. Thereafter, it displays a time series graph of the past data on the display apparatus 13. At this time, it simultaneously processes the plurality of past data by way of the superposition determining/displaying means 27 and displays graphs in superposition as shown in FIG. 20. The operator can determine alarm-triggering limit values, visually checking the graph of the past data that is being displayed.

Then, as a result, the operator can define alarm-triggering limit values, seeing the time series graph of the past instances where an abnormality actually took place and considering the time necessary for preventing an abnormality from taking place.

Eighth Embodiment

Figure 8:
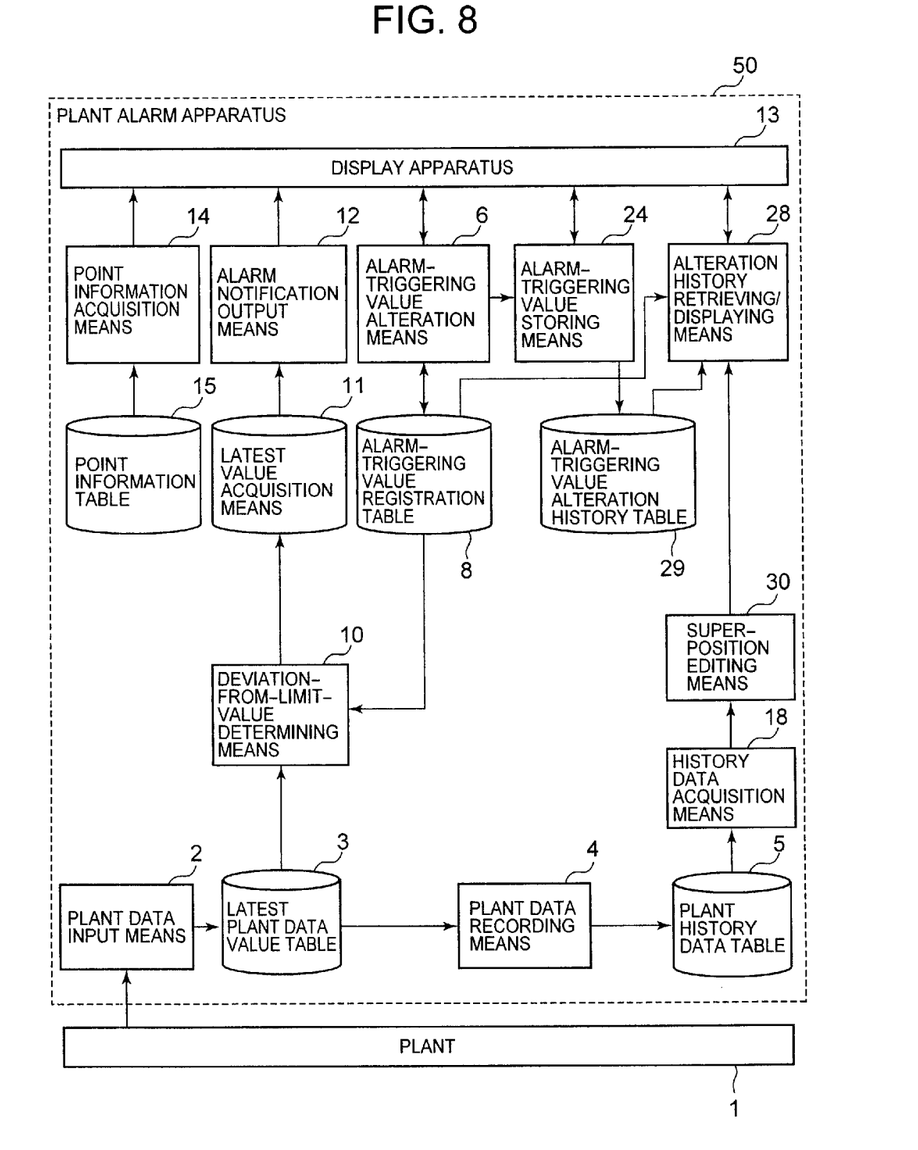
FIG. 8 is a schematic block diagram of an eighth embodiment of plant alarm apparatus according to the present invention.
Figure 21:
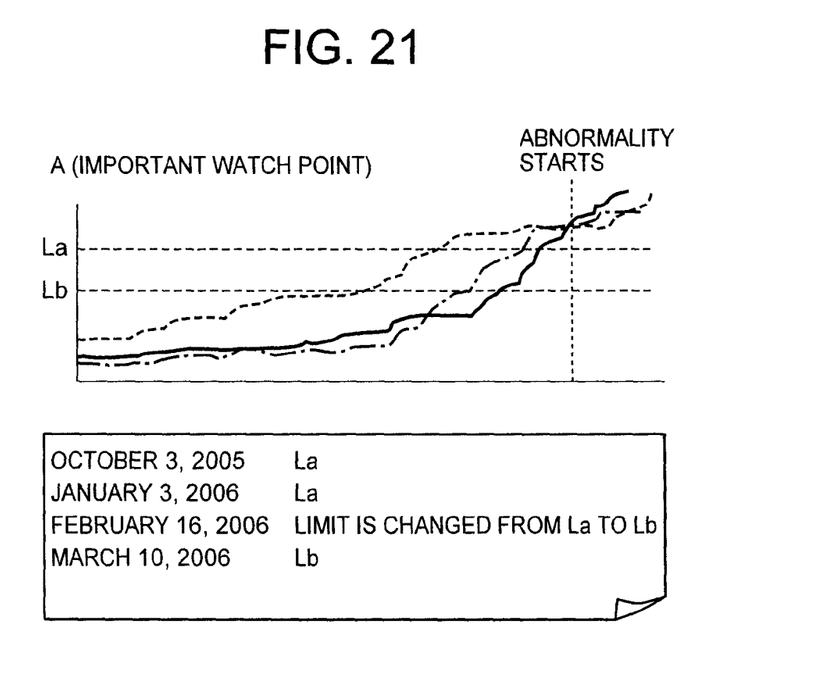
FIG. 21 is a schematic illustration of an exemplary display of limit value alteration history that can be used for the eighth embodiment of the present invention.

Now, the eighth embodiment of the present invention will be described below by referring to FIGS. 8 and 21. FIG. 8 is a schematic block diagram of the eighth embodiment of plant alarm apparatus. FIG. 21 is a schematic illustration of an exemplary display of limit value alteration history that can be used for the eighth embodiment.

As shown in FIG. 8, the eighth embodiment is characterized by having an alteration history retrieving/displaying means 28, an alarm-triggering value alteration history table 29 and a superposition editing means 30 if compared with the seventh embodiment.

This embodiment displays a list of points on the display apparatus 13 by way of the point information acquisition means 14. History data acquisition means 18 acquires the past data of the specified points from the plant history data table 5 on the basis of the displayed points. Then, the embodiment displays a graph of the acquired plant data on the display apparatus 13. The alarm-triggering value storing means 24 acquires data from the alarm-triggering value registration table 8 and the alarm-triggering value alteration history table 29 and edits the acquired data.

Then, the embodiment specifies the points for which the history of alteration of the alarm-triggering values are to be displayed out of the displayed points and acquires the past data of the specified points by way of the alarm-triggering value storing means 24. Thereafter, it displays a time series graph of the past data on the display apparatus 13. At this time, the embodiment can process a plurality of past data simultaneously. Thus, graphs of a plurality of past data are displayed in superposition. The embodiment acquires data from the alarm-triggering value registration table 8 and the alarm-triggering value alteration history table 29 and displays them in a manner as shown in FIG. 21. The operator determines alarm-triggering limit values, visually checking the alternation history that is being displayed.

In this way, the operator can visually check how the alarm-triggering limit values have been altered. Past alarm-triggering limit values can be restored when the conditions of a device are changed as a result of periodical service. Thus, the past conditions and performances can be utilized.

What is claimed is:

1. A plant alarm apparatus comprising:
  plant data input means for periodically taking in plant data from each of sensors arranged in a plant;
  a latest plant data value table for temporarily storing latest values of the plant data taken in by the plant data input means;
  plant data recording means for taking out the latest values of the data of the latest plant data value table and storing the latest values in a plant history data table as long term time series plant data;
  alarm-triggering value alteration means for updating points for detecting any plant abnormality in an alarm-triggering value registration table in response to a request made by an operator;
  alarm-triggering condition editing means for registering alarm-triggering conditions of at least one point showing a foretoken of abnormality in an alarm-triggering condition table when the plant falls into an abnormal condition, the alarm-triggering condition editing means determining the alarm-triggering conditions of the at least one point showing a foretoken of abnormality, the at least one point being different from an important point that directly shows an abnormality of the plant;

deviation-from-limit-value determining means for reading the stored values of the alarm-triggering value registration table and the alarm-triggering condition table and comparing limit values of at least one point for detecting any abnormality of the plant and the alarm-triggering conditions with a latest plant data value; and alarm notification output means for outputting an outcome of the comparison to a display apparatus when the comparison by the deviation-from-limit-value determining means shows a deviation from a predetermined range.

2. The apparatus according to claim 1, wherein the alarm-triggering condition editing means registers alarm-triggering conditions obtained by using the plant data of a plurality of points in the alarm-triggering condition table.

3. The apparatus according to claim 2, further comprising:

means for predicting the alarm-triggering conditions of the plant data of at least one point showing a foretoken of abnormality a predetermined time period in advance to occurrence of an abnormality of the plant according to the plant history data stored in the plant history data table by the plant data recording means, and generating a foretoken alarm when plant data meet the alarm-triggering conditions.

4. The apparatus according to claim 1, wherein, when the outcome of the comparison by the deviation-from-limit-value determining means deviates from the predetermined range, an operator is notified of the outcome at least by one of means selected by the operator out of screen display, electronic mail, and sound announcement.

5. The apparatus according to claim 1, further comprising:

superposition determining/displaying means for displaying a series of continuous past data going back from current time and a series of continuous data that ended in a past abnormality in superposition on a same graph as data of at least one point of the plant specified by the operator.

6. The apparatus according to claim 5, further comprising:

means for displaying history of alarm-triggering values in association with the series of continuous data that ended in a past abnormality.

7. A plant alarm method comprising:

periodically taking in plant data from each of sensors arranged in a plant;

temporarily storing latest values of the taken in plant data in a latest plant data value table;

taking out the latest values of the data of the latest plant data value table and storing the latest values in a plant history data table as long term time series plant data;

updating points for detecting any plant abnormality in an alarm-triggering value registration table in response to a request made by an operator;

registering alarm-triggering conditions of at least one point showing a foretoken of abnormality in an alarm-triggering condition table when the plant falls into an abnormal condition, the registering alarm-triggering conditions includes determining the alarm-triggering conditions of the at least one point showing a foretoken of abnormality, the at least one point being different from an important point that directly shows an abnormality of the plant;

reading the stored values of the alarm-triggering value registration table and the alarm-triggering condition table and comparing limit values of at least one point for detecting any abnormality of the plant and the alarm-triggering conditions with a latest plant data value; and outputting an outcome of the comparison to a display apparatus when the comparison by reading the stored values and comparing limit values shows a deviation from a predetermined range.

* * * * *